United States Patent
Schinko et al.

(10) Patent No.: US 10,024,192 B2
(45) Date of Patent: Jul. 17, 2018

(54) CERAMIC COMPONENT FOR A TURBOMACHINE

(71) Applicant: MTU Aero Engines AG, Munich (DE)

(72) Inventors: Norbert Schinko, Munich (DE); Janine Sangl, Dachau (DE); Stephan Klaen, Berlin (DE); Markus Schlemmer, Mainburg/Wambach (DE)

(73) Assignee: MTU Aero Engines AG & Co. KG, Munich (DE)

( * ) Notice: Subject to any disclaimer, the term of this patent is extended or adjusted under 35 U.S.C. 154(b) by 1029 days.

(21) Appl. No.: 14/322,515

(22) Filed: Jul. 2, 2014

(65) Prior Publication Data

US 2015/0016957 A1    Jan. 15, 2015

(30) Foreign Application Priority Data

Jul. 9, 2013 (DE) .................. 10 2013 213 386

(51) Int. Cl.
| | |
|---|---|
| *F01D 25/28* | (2006.01) |
| *F16J 15/3288* | (2016.01) |
| *F01D 21/04* | (2006.01) |
| *F16J 15/44* | (2006.01) |
| *F01D 11/02* | (2006.01) |
| *F01D 11/00* | (2006.01) |

(52) U.S. Cl.
CPC ............ *F01D 25/28* (2013.01); *F01D 11/025* (2013.01); *F01D 21/045* (2013.01); *F16J 15/3288* (2013.01); *F16J 15/445* (2013.01); *F01D 11/00* (2013.01); *F05D 2240/56* (2013.01); *F05D 2240/60* (2013.01); *F05D 2300/20* (2013.01); *F05D 2300/50* (2013.01); *F05D 2300/6033* (2013.01)

(58) Field of Classification Search
CPC ......... F01D 25/28; F01D 11/00; F01D 11/025
USPC ............................................. 415/9; 277/355
See application file for complete search history.

(56) References Cited

U.S. PATENT DOCUMENTS

| | | | |
|---|---|---|---|
| 5,688,105 A | 11/1997 | Hoffelner | |
| 5,759,301 A * | 6/1998 | Konter | C22C 19/057 148/404 |
| 5,794,938 A | 8/1998 | Hoefner | |
| 5,927,721 A | 7/1999 | Schulze et al. | |
| 6,077,038 A | 6/2000 | Gail et al. | |
| 6,254,344 B1 | 7/2001 | Wright et al. | |
| 6,830,428 B2 * | 12/2004 | Le Biez | F01D 5/20 415/173.4 |
| 8,376,367 B2 * | 2/2013 | Beichl | F16J 15/3288 277/355 |

(Continued)

FOREIGN PATENT DOCUMENTS

| | | |
|---|---|---|
| DE | 69907859 | 10/2003 |
| DE | 102004033924 | 2/2006 |

(Continued)

*Primary Examiner* — Justin Seabe
*Assistant Examiner* — Behnoush Haghighian
(74) *Attorney, Agent, or Firm* — Davidson, Davidson & Kappel, LLC

(57) ABSTRACT

A ceramic component for a turbomachine, the ceramic component (1) being configured to be destroyed in response to a contacting with another component (2) of the turbomachine that moves relative to the ceramic component (1). A turbomachine component pairing and a turbomachine including such a ceramic component.

12 Claims, 1 Drawing Sheet

(56) References Cited

U.S. PATENT DOCUMENTS

| | | | |
|---|---|---|---|
| 9,643,240 B2* | 5/2017 | Fargeas | ................... B22C 9/04 |
| 2003/0175116 A1 | 9/2003 | Le Biez et al. | |
| 2007/0160457 A1 | 7/2007 | Bilson et al. | |
| 2009/0087309 A1 | 4/2009 | Schreiber | |

FOREIGN PATENT DOCUMENTS

| | | |
|---|---|---|
| DE | 60217456 | 11/2007 |
| EP | 0185603 | 6/1986 |
| EP | 1918531 | 5/2008 |

* cited by examiner

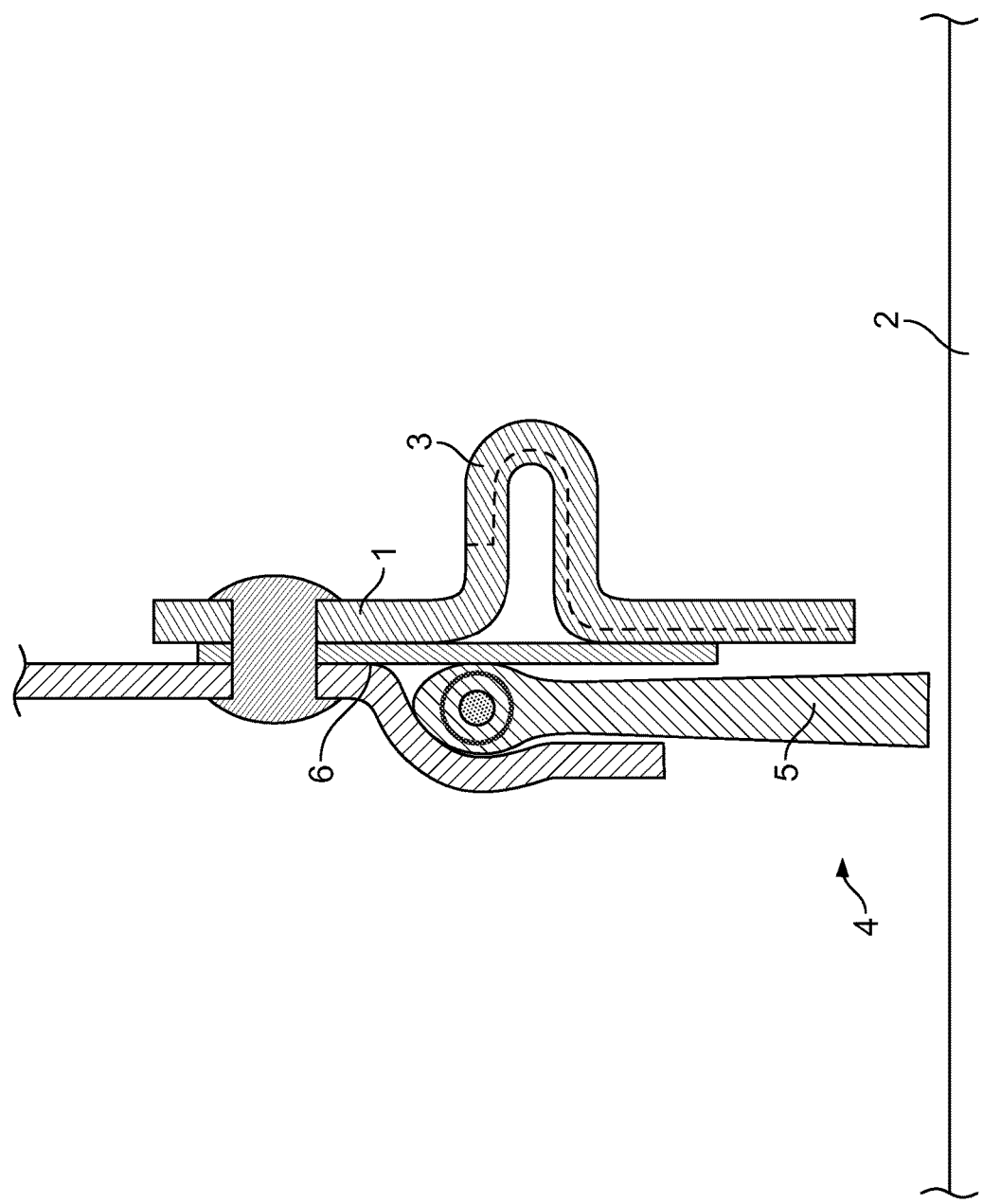

CERAMIC COMPONENT FOR A TURBOMACHINE

This claims the benefit of German Patent Application DE 10 2013 213 386.3, filed Jul. 9, 2013 and hereby incorporated by reference herein.

The present invention relates to a ceramic component for a thermal turbomachine, in particular a gas turbine, that is destroyed in response to critical faults in order to avoid damage to surrounding safety-critical components.

BACKGROUND

Upon the occurrence of specific faults in turbomachines, certain deflections of individual components are to be expected, such as radial deflections of turbomachine shafts. To prevent damage to or even destruction of such components in the event of a deflection thereof that can occur in response to a contacting by further components that are contiguous thereto, predetermined minimum distances are observed between the individual components.

Thus, for example, at narrow points between the rotor shafts and stator components, the danger arises of the stator components damaging rotating components in response to a contact, should the rotor be substantially eccentrically deflected in the event of a fault. The high speed of the rotor can cause it to be severed already in response to a short-duration contact with the often sharp-edged stator components. Accordingly, components that are moving relative to one another must be prevented in any case from coming into mutual contact. For that reason, the motionless stator components are cut far back in order to avoid a contacting between the stator-side and rotor-side components, even in the case of extreme deflections of the rotor.

The U.S. Pat. Nos. 6,077,038, 5,688,105, 5,927,721 and 5,794,938 describe sealing sections, whose brush seals are positioned by holding devices. These holding devices are located at a predetermined distance from the corresponding shafts, so that the shaft is always only contacted by the flexible brush seals themselves, even in the case of a possible radial deflection of the shaft.

However, since the sealing action to be achieved for such sealing elements is dependent upon how far apart the components are spaced that move relative to one another and bound a free space to be sealed, a compromise is needed between a maximum possible sealing action and protection against damage or destruction.

SUMMARY OF THE INVENTION

It is an object of the present invention to reduce to a minimum the distance between two components that move relative to one another, without risking damage to or even destruction of certain components in the event of a fault.

The present invention provides a ceramic component for a turbomachine is provided that is designed to be destroyed in response to a contacting with another turbomachine component that moves relative to the ceramic component.

It has been recognized in accordance with the present invention, namely, that due to the sensitivity thereof to certain loads, ceramics are especially well suited for manufacturing turbomachine components that are to be deliberately destroyed to avoid contact-induced damage to or destruction of safety-critical components. Thus, the distance between two components that move relative to one another can be reduced to a minimum through the use of ceramic materials, without violating specific safety criteria.

In accordance with one preferred specific embodiment of the present invention, the ceramic component is a stationary component of the turbomachine and, in the installed state, retains the position thereof within the turbomachine. Thus, the component that is moving relative to the ceramic component also moves relative to the entire turbomachine. In particular, the moving component of the turbomachine may be a rotationally driven component, especially a shaft.

To influence the shattering, respectively fracture behavior of the ceramic component, it is also conceivable that the ceramic component feature at least one weakened zone having reduced strength. Should a contact arise between the ceramic component and the component that moves relative thereto, along with an associated loading of the ceramic component, the reduced strength in the weakened zone effects a targeted failure of the ceramic component in the weakened zone. To this end, it is conceivable that the ceramic component have a reduced material thickness within the weakened zone, automatically resulting in a reduced strength therein. Alternatively or additionally thereto, the ceramic component may be configured to be subject to an increased loading in the event of contacting in the weakened zone, in particular, a flexural, shearing and/or tensile loading. This may be realized, for example, in that the ceramic component within the weakened zone is formed differently than it is outside of the weakened zone. Thus, for instance, the direction of extent within the weakened zone may differ from that of the weakened zone. In the specific case, a flexural loading of the ceramic component within the weakened zone is conceivable; outside of the weakened zone, merely a pressure loading being present against which the ceramic component exhibits an increased resistance.

In general, the ceramic component may be so designed that the failure, respectively destruction thereof occurs only as of a predetermined load magnitude that, however, must always lie below the value above which damage to the component to be protected is likely to occur.

In accordance with one especially preferred embodiment of the present invention, the ceramic component at least partially bounds a passage opening for the moving component. Thus, for example, the ceramic component may be annularly formed and thereby circumferentially bound a shaft passage. However, it is likewise conceivable that the ceramic component only partially bounds the passage opening, thus only together with other components that, in the entirety, are able to form a ring, for example. In this context, the term 'bound' is understood to connote that the components defining the passage opening constitute precisely those components which extend the furthest to the component that moves relative thereto and, thus, would be the first to be contacted in response to a deflection of the moving component.

In particular, the shaft passage may form a sealing section and include a seal, in particular a brush seal; the ceramic component being connected to the holding device for the seal or being part of the holding device. As already clarified further above, such sealing sections may feature brush seals that contact the shaft. It is absolutely necessary to prevent the shaft from being contacted by any other components of the sealing section, should they not able to be immediately destroyed by the fracture behavior thereof. Therefore, in accordance with the present invention—apart from the brush seal itself—, all of the components located in the deformation region of the shaft that could be contacted by the shaft in the event of a fault, are ceramic components and, due to the brittleness thereof, may be destroyed as a consequence a contacting.

The ceramic component is preferably entirely fabricated of a ceramic. However, it is likewise conceivable that merely individual partial regions of the ceramic component be made of a ceramic material which, upon failure thereof, effects a destruction of the ceramic component as a whole. A monocrystalline and/or a fiber-reinforced ceramic material are/is preferably used as ceramic material.

Another aspect of the present invention provides that the ceramic component be configured within a component pairing and be destroyed as a consequence of a contacting with the component that moves relative thereto, before the moving component is damaged due to the contacting. In the case of a known damage behavior of the moving component, the destruction threshold of the ceramic component may be structurally exactly defined in a way that ensures that damage to or even destruction of the moving component can never occur in the event of the moving component contacting the ceramic component, and that always only the ceramic component is destroyed.

Another aspect of the present invention relates to a turbomachine, in particular a gas turbine that includes a ceramic component, as described above, or a component pairing as described above.

BRIEF DESCRIPTION OF THE DRAWINGS

The present invention is clarified in the following with reference to the attached drawing. The present invention may include the features described herein individually, as well as in any practical combination.

Specifically,

FIG. 1: shows a sealing section of a turbomachine shaft configured in accordance with the present invention.

DETAILED DESCRIPTION

The sealing section shown in FIG. 1 encompasses a ceramic component 1 that is riveted to holding device 6 for brush seal 5 and is configured as an annular body in order to circumferentially bound shaft passage 4. In the normal operating state, shaft 2 that rotates about a horizontally extending axis of rotation is exclusively contacted by brush seal 5 that is fixed in position by holding device 6 and that seals annular gap 4 formed between shaft 2 and holding device 6. To enhance the sealing action of brush seal 5, annular gap 4 is reduced in size by ceramic component 1 in the radial extent thereof.

Should shaft 2 be radially deflected within the turbomachine due to a fault, holding device 6 is cut so far back that a contacting of shaft 2 with holding device 6 is not to be expected. However, in accordance with the present invention, a contact may occur between shaft 2 and ceramic component 1, since ceramic component 1 would be immediately destroyed due to the brittle fracture behavior thereof, even before damage occurs at shaft 2.

To selectively influence the fracture behavior of the ceramic component, it features a weakened zone 3 having a reduced material thickness, which is indicated in FIG. 1 by the dotted line. In addition, it is discernible that, in weakened zone 3, ceramic component 1 has a direction of extent that deviates from the normally radial direction of extent in parallel to the axis of rotation of shaft 2. It is readily conceivable that a radial deflection of shaft 2 in the radially extending regions of ceramic component 1 leads to a compressive loading of ceramic component 1; on the other hand, to a flexural loading in the axially extending regions. It is this flexural loading on the ceramic that leads to a failure of ceramic component 1, should a contacting with the shaft occur.

What is claimed is:

1. A sealing section for a turbomachine comprising:
   a brush seal having brushes for contacting a shaft;
   a holding device holding the brush seal, the holding device extending radially to back brushes of the brush seal; and
   a ceramic component contacting the holding device and extending radially beyond the holding device, a section of the ceramic component designed to be destroyed in response to contact with the shaft;
   wherein the section is a U-shaped section and wherein legs of the U-shaped section extend axially parallel to an axis of rotation.

2. The sealing section as recited in claim 1 wherein the holding device and the ceramic component are connected at a connection radially outward of the brush seal.

3. The sealing section as recited in claim 2 wherein holding device has a front and a rear and the brush seal is located partially between the front and the rear, the rear backing the brush seal.

4. The sealing section as recited in claim 1 wherein the section includes at least one weakened zone having a reduced material thickness compared to a rest of the ceramic component.

5. The sealing section as recited in claim 1 wherein the ceramic component at least partially bounds a passage opening provided for the shaft.

6. The sealing section as recited in claim 1 wherein holding device has a front and a rear and the brush seal is located partially between the front and the rear, the rear backing the brush seal.

7. The sealing section as recited in claim 6 wherein the front, the rear and the ceramic plate are connected at a connection radially outwardly of the brush seal.

8. The sealing section as recited in claim 1 wherein the ceramic component includes a monocrystalline ceramic material or a fiber-reinforced ceramic material.

9. The sealing section as recited in claim 1 wherein the ceramic component is spaced apart from the brushes.

10. A turbomachine comprising the sealing section as recited in claim 1 and the shaft.

11. A method of providing sealing for a shaft of a turbomachine comprising:
    providing the sealing section as recited in claim 1 so as to permit sealing of the shaft via the brush seal, the ceramic component being designed to permit the ceramic component to fracture at the section upon contact with the shaft.

12. A sealing section for a turbomachine comprising:
    a brush seal having brushes extending radially inwardly;
    a holding device holding the brush seal, the holding device extending radially to back brushes of the brush seal; and
    a ceramic component contacting the holding device but not the brush seal and extending radially beyond the holding device and having a U-shaped section, wherein legs of the U-shaped section extend axially parallel to an axis of rotation of the shaft.

* * * * *